US006063715A

United States Patent [19]

Holbeck et al.

[11] Patent Number: 6,063,715

[45] Date of Patent: May 16, 2000

[54] REINFORCED CERAMIC FIBER ENCLOSURE AND METHOD OF MAKING SAME

[75] Inventors: John H. Holbeck, Calimesa; Richard D. Roy, Redlands, both of Calif.

[73] Assignee: Degussa-Ney Dental, Inc., Bloomfield, Conn.

[21] Appl. No.: 09/207,778

[22] Filed: Dec. 9, 1998

Related U.S. Application Data

[63] Continuation of application No. 08/692,235, Aug. 7, 1996, abandoned.

[51] Int. Cl.[7] .......... B32B 15/01

[52] U.S. Cl. .......... 442/16; 442/6; 442/13; 442/18; 428/34.1; 428/550; 428/155; 219/309; 219/406; 219/407; 219/429

[58] Field of Search .......... 428/550, 34.1, 428/155; 442/13, 6, 18; 219/390, 406, 407, 424

[56] References Cited

U.S. PATENT DOCUMENTS

| | | | |
|---|---|---|---|
| 3,749,882 | 7/1973 | Piklington et al. | 219/390 |
| 3,936,535 | 2/1976 | Boder | 427/228 |
| 4,059,712 | 11/1977 | Bothwell | 428/36 |
| 4,272,237 | 6/1981 | Smith | 431/328 |
| 4,324,602 | 4/1982 | Davis et al. | 156/71 |
| 4,382,820 | 5/1983 | Inoue | 106/90 |
| 4,547,148 | 10/1985 | Holmer | 431/328 |
| 4,698,948 | 10/1987 | Yamashita et al. | 52/410 |
| 5,063,861 | 11/1991 | Imogawa et al. | 110/336 |
| 5,250,269 | 10/1993 | Langer | 422/179 |
| 5,326,631 | 7/1994 | Carswell et al. | 428/256 |
| 5,454,845 | 10/1995 | Anahara et al. | 55/267 |
| 5,575,970 | 11/1996 | Colbe | 266/44 |

*Primary Examiner*—Blaine Copenheaver
*Assistant Examiner*—Arti R. Singh

[57] ABSTRACT

A reinforced ceramic fiber enclosure for muffle furnaces and the like defining a cavity therewithin includes a perforate metallic skeleton defining at least a portion of the peripheral wall of the enclosure and fibrous insulation encapsulating the skeleton with fibers of the insulation extending through the perforations of the skeleton. In some embodiments the enclosure is of rectangular cross section with base, top and side walls. The top and side walls generally extend over only a portion of the length of the enclosure, and mounting and support flanges are desirably provided on at least the front end of the skeleton. To make the enclosure, the skeleton is supported on the exterior of a vacuum mold in spaced relationship thereto, and the mold and skeleton are immersed in slurry of ceramic fibers and a bonding agent therefor. The vacuum drawn through the mold causes the fibers and bonding agent to deposit on the mold and encapsulate the skeleton with fibers extending through the perforations of the skeleton.

10 Claims, 8 Drawing Sheets

REINFORCED CERAMIC FIBER ENCLOSURE AND METHOD OF MAKING SAME

CROSS REFERENCE TO RELATED APPLICATION

The present application is a continuation of application Ser. No. 08/692,235 filed on Aug. 7, 1996 now abandoned.

BACKGROUND OF THE INVENTION

The present invention relates to a muffle for a furnace and to a method for making such muffles from ceramic fibers.

Muffle furnaces are widely used because of the high temperatures, accurate control characteristics, speed and convenience which they afford. It is necessary to provide insulation about the heating elements of the furnace to ensure that the interior chamber of the furnace provides the temperature necessary and maintains constant temperature. Hence, a characteristic necessary for safe and efficient muffle furnace operation are walls which include insulation material of substantial thickness and good insulating properties. For example, on the average, the insulation in a typical muffle will have a thickness of approximately 2 inches.

In addition to providing adequate insulating capabilities, another important requirement for a muffle wall is that it be structurally stable. Hitherto, muffles have generally been fabricated by assembling five blocks of insulation in a spatial, self-supporting manner to create a box with an open end to define the chamber for the oven. The blocks of insulation to be self-supporting must be assembled together using a refractory cement applied between abutting surfaces of the blocks. This process takes time and adds to the overall cost of the product. In addition, the insulation blocks must be assembled in such a manner as to accommodate the thermal expansion and contraction resulting from very wide temperature ranges. Thus, the end connections between the insulation blocks must accommodate the thermal expansion, and this may affect the inherent stability of the muffle structure. An example of such a prior art muffle assembled in this manner is disclosed in U.S. Pat. No. 3,749,882 issued to Pilkington et al. on Jul. 31, 1973.

As a result, there have been efforts to mold a muffle in one piece in a vacuum mold using a form, upon which a slurry is deposited. Such one-piece muffles have been found to be relatively vulnerable to imports and other stresses.

Accordingly, it is an object of the invention to provide a novel muffle which is formed as a unitary member and which is relatively rugged in construction and self-supporting.

It is also an object to provide such a muffle with structural features which facilitate its stable seating in a furnace.

Another object is to provide a novel method for making such a muffle from ceramic fibers and which is economical and relatively simple to practice.

SUMMARY OF THE INVENTION

It has now been found that the foregoing and related objects may be readily attained in a reinforced ceramic fiber enclosure for muffle furnaces and the like defining a cavity therewithin. The enclosure comprises a perforate metallic skeleton defining at least a portion of the peripheral wall of the muffle and having front and rear ends, and fibrous insulation encapsulating the skeleton with fibers of the insulation extending through the perforations of the skeleton.

Generally, the enclosure is of rectangular cross section with base, top and side walls. In larger models, the base wall of the skeleton extends substantially over the length of the base wall of the enclosure, and the skeleton extends over only a portion of the length of the top and side walls of the enclosure. The enclosure will normally include a back wall, and the skeleton may include a perforate back wall.

Desirably, the skeleton has an outwardly extending flange at the front end of the enclosure for attachment to the support structure of a muffle furnace or the like. The skeleton also includes an outwardly extending flange at the rear end thereof, and desirably includes a base wall with depending flanges extending along the length of the sides of the bottom of the enclosure.

In the method of making the ceramic fiber enclosure for muffle furnaces and the like, the steps comprise forming a perforate metallic skeleton defining at least a portion of the desired peripheral configuration for the enclosure. The skeleton is supported on the exterior of a vacuum mold and in spaced relationship thereto, and the mold and skeleton are immersed in a slurry of ceramic fibers and a bonding agent therefor. A vacuum is drawn through the mold to cause the fibers and bonding agent to deposit on the mold and encapsulate the skeleton with ceramic fibers extending through the perforations of the skeleton. The fibers and bonding agent deposited on the mold are dried to provide a form-sustaining structure which is then removed from the mold.

Generally, the removed structure is dried further to provide the desired enclosure.

Preferably, the slurry is an aqueous slurry of aluminum silicate fibers and colloidal silica.

The step of forming the skeleton desirably produces a generally rectangular cross section therefor. The base or top wall of the skeleton desirably extends over substantially the entire length of the enclosure, and the side walls thereof extend over only a portion of the length thereof. The vacuum drawing step also deposits fibers and bonding agent on the end wall of the vacuum mold to provide a back wall for the enclosure, and the step of forming the skeleton may include providing a perforate back wall.

DETAILED DESCRIPTION OF THE PREFERRED EMBODIMENT

Figure 1:
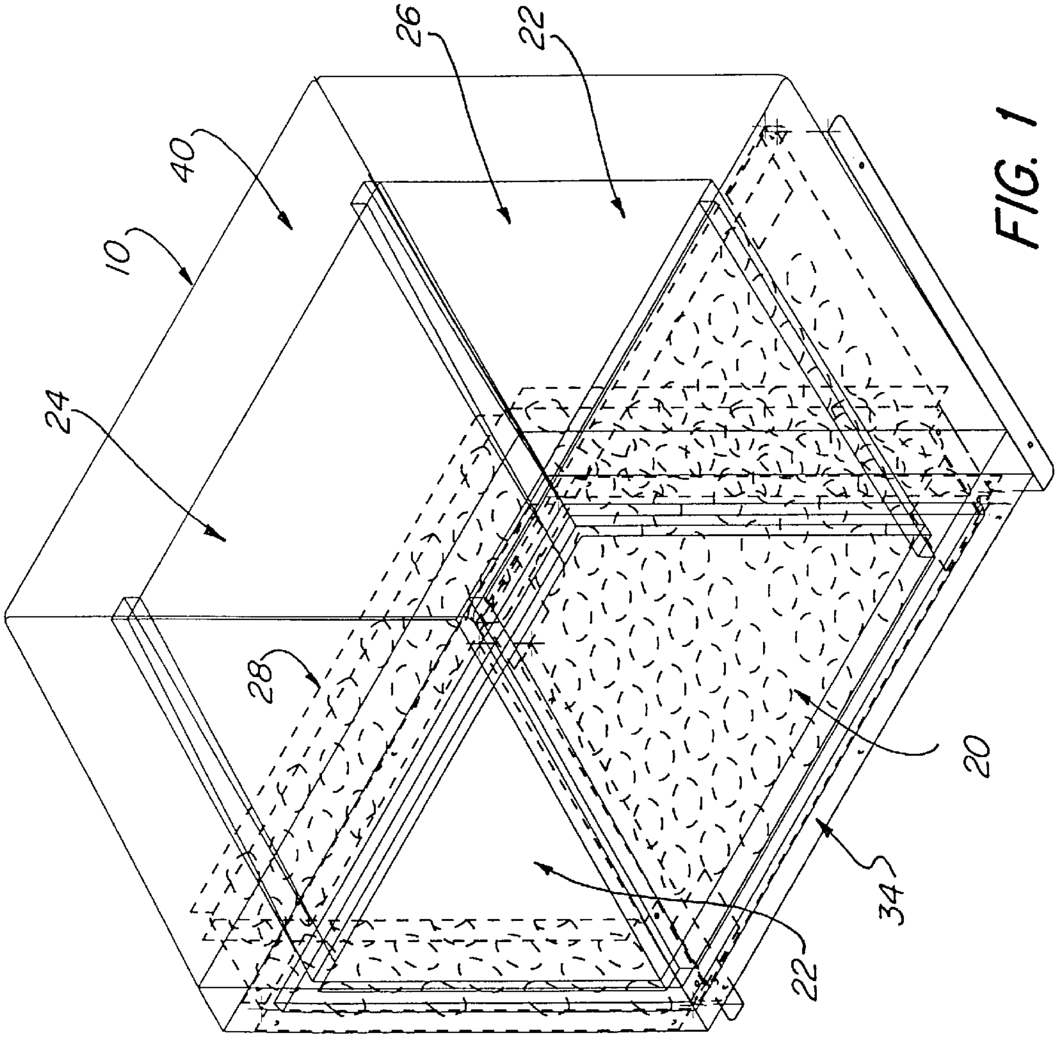
FIG. 1 is a perspective view of a muffle embodying the present invention with the reinforcing structure shown in broken line.

Turning first to FIG. 1, therein illustrated is a muffle embodying the present invention and generally designated by the numeral 10. As seen, the muffle is a self supporting unitary five-sided structure having a base wall 20, side walls 22, a top wall 24 and rear wall 26. Together these walls define a chamber 44 therewithin which is accessible through the opening 46 provided by the open front face of the muffle.

As illustrated in broken line in FIG. 1, the muffle 10 includes a skeleton or structural reinforcement generally designated by the numeral 28 which is substantially encapsulated within the insulating material generally designated by the numeral 40. The skeleton 28 extends over substantially the entire area of the base wall 20 and over only a portion of the side walls 22 and top wall 24 in the illustrated embodiment. The skeleton 28 is provided with perforations 34 through which the fibers of the insulating material extend between the inner layer 40*a* and insulating outer layer 40*b*.

Figure 2:
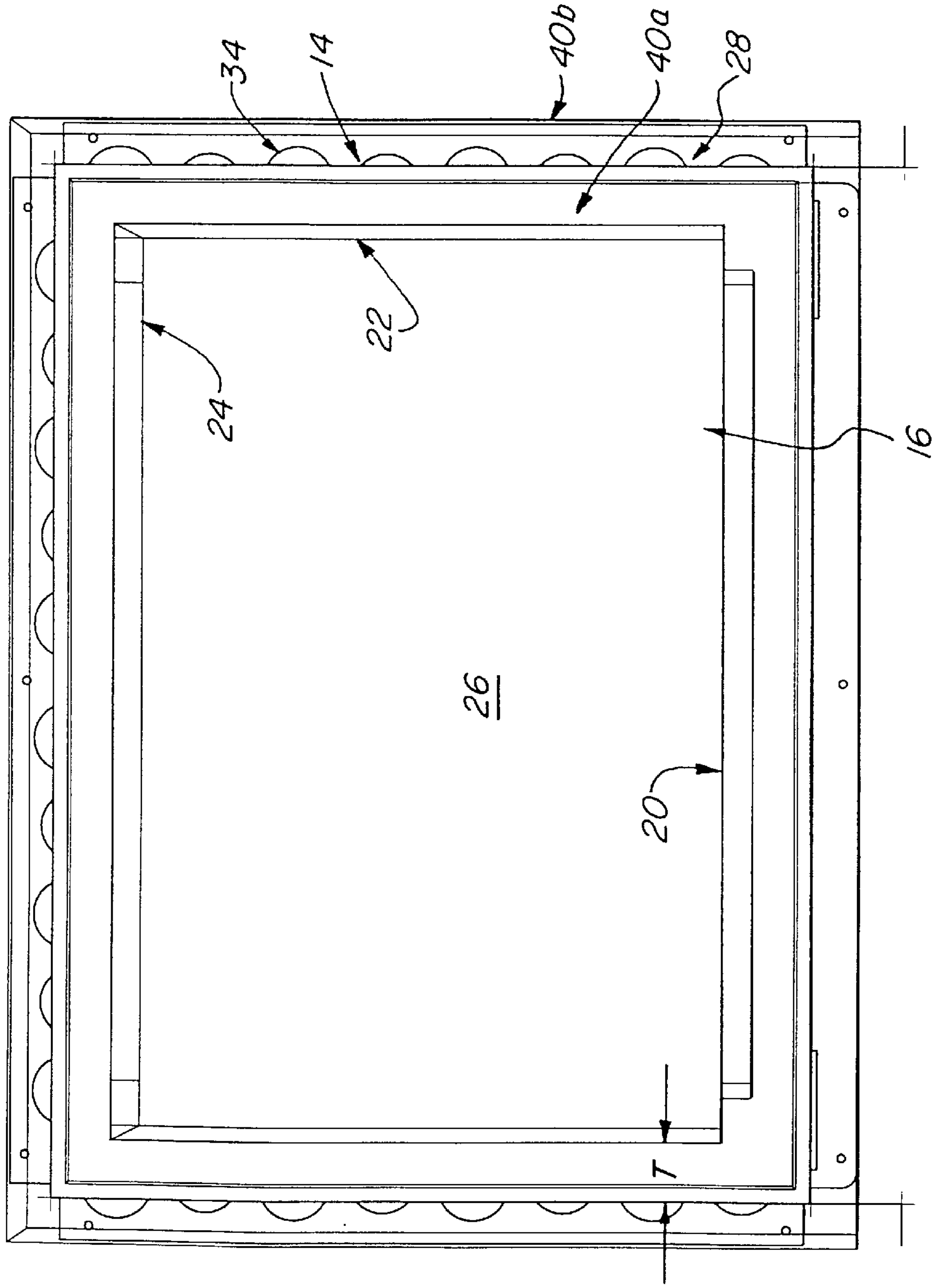
FIG. 2 is a front elevational view of the muffle of FIG. 1.

As seen in FIG. 2, the skeleton 28 has a flange 14 extending outwardly about its front end 16 by which the muffle 10 may be securely fastened within the chamber of a furnace.

Figure 4A:
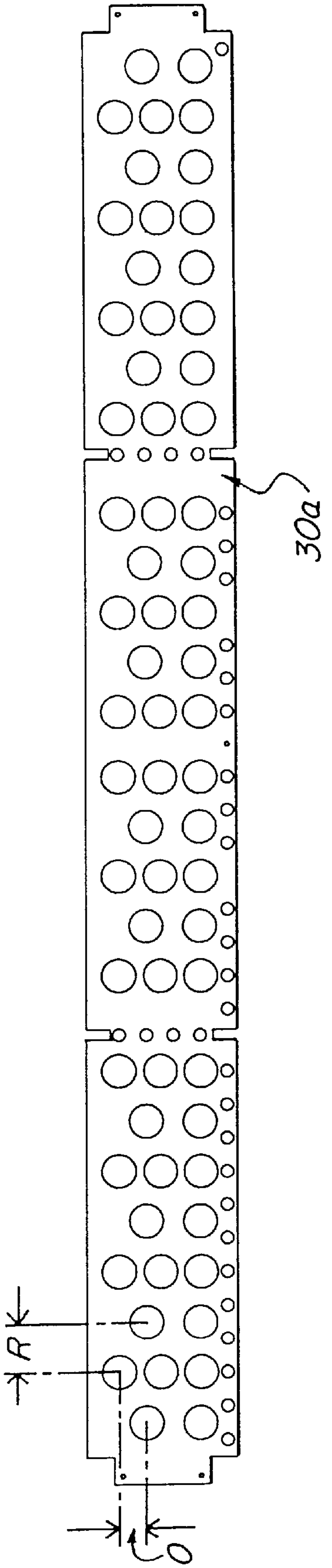
FIG. 4*a* is a plan view of a metallic blank used to provide one part of the reinforcing structure of the muffle prior to its being bent into the U-shape shown in FIG. 4*b;*
Figure 4B:
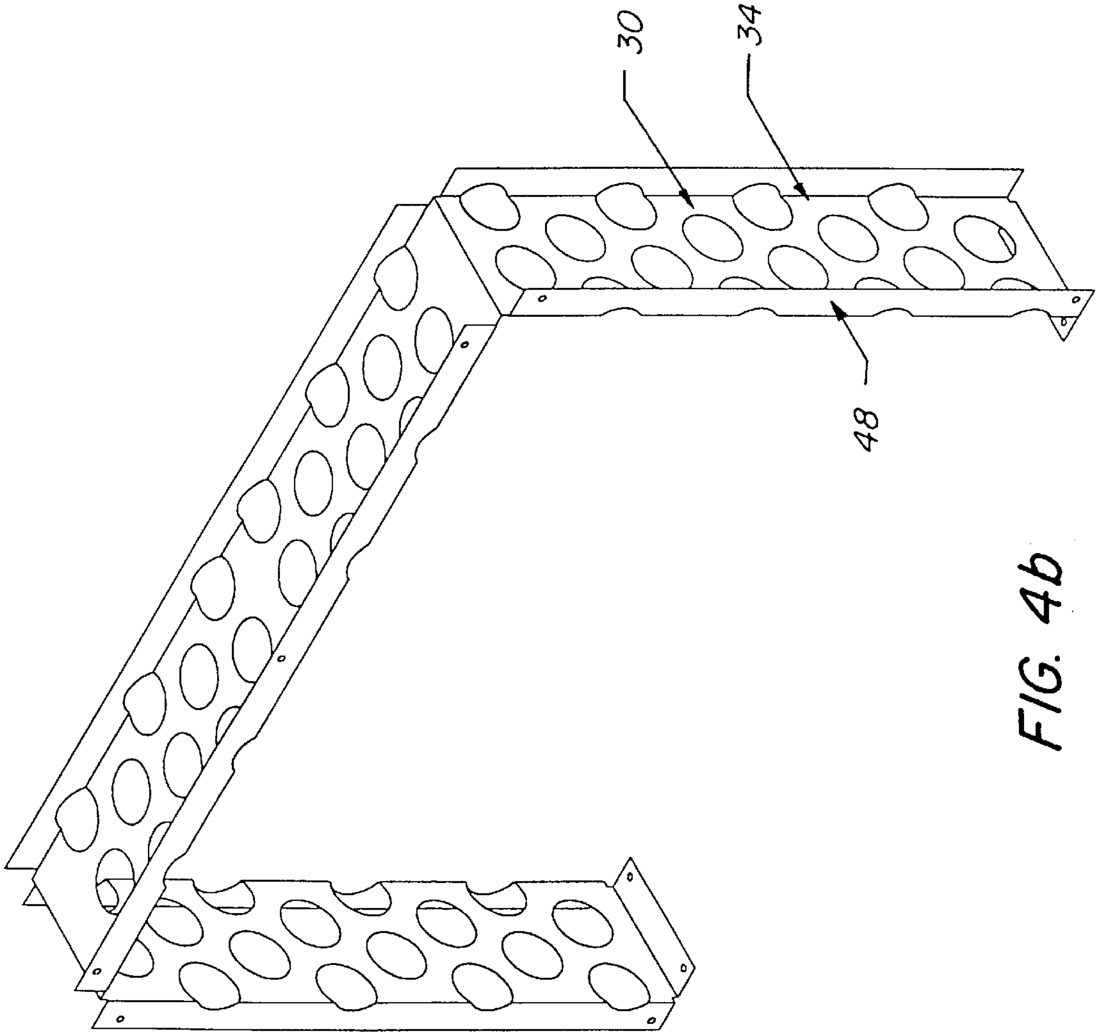
FIG. 4*b* is a perspective view of the upper U-shaped part of the reinforcing structure.
Figure 5:
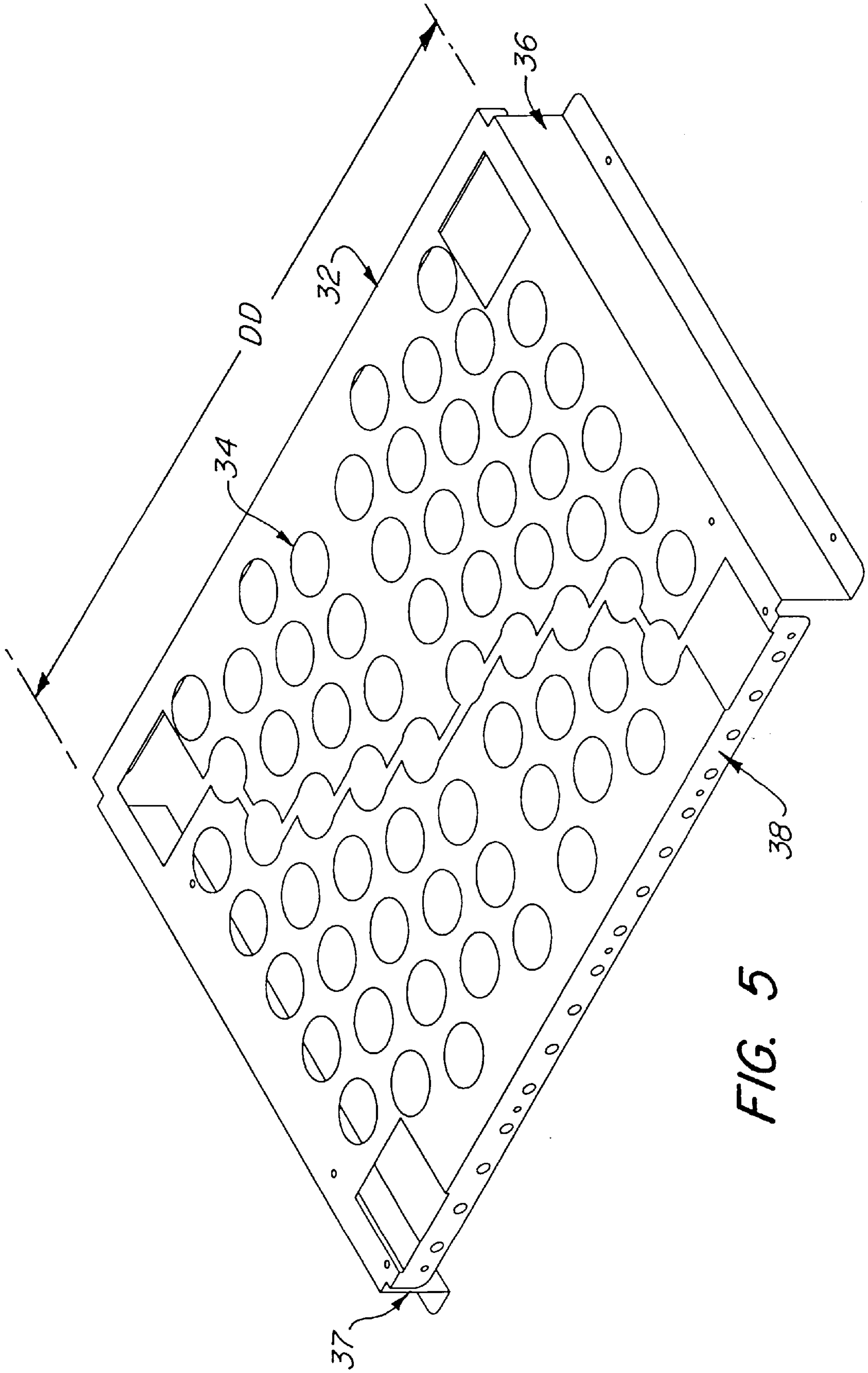
FIG. 5 is a perspective view of the base part of the reinforcing structure.

The skeleton 28 includes a base element 32 illustrated in FIG. 5 having depending side flanges 36, 37, and relatively front and rear flanges 38. In FIG. 4*a* is illustrated a blank 30*a* for forming the U-shaped skeleton element 30 seen in FIG. 4*b* which provides the side walls and top wall of the skeleton 28 seen in FIGS. 1 and 2. Outwardly extending flanges 48 are provided along the front and rear edges of the U-shaped element 30 as seen in FIG. 4*b*. The U-shaped element 30 of the skeleton 28 is fitted over the forward portion of the base element 32 to provide the skeleton 28 for forming the muffle.

Forming of the general U-shaped element 30 of the skeleton 28 is accomplished by notching the sheet material which permits it to be folded on itself in a transverse direction along fold lines to thereby integrally create the side portions and the connecting top portion from a single piece of material. Similarly, as illustrated in FIG. 5, the base element 32 is formed from sheet metal and is bent along its side edges to form the support flanges or legs 36 which support the base element 32 above the mounting surface of the furnace 12. The support legs 36 are dimensioned to extend downwardly and outwardly of the base wall 20 of the muffle 10 for this purpose. The base element 32 has a dimension which is slightly shorter than the spacing between the facing inner surfaces of the side walls of the U-shaped element 30 so as to be received therebetween. The lower ends of the side of the U-shaped element 30 are connected to the support legs 36 by appropriate means such as a tack weld or by rivets, to create the generally rectangular configuration.

Figure 6:
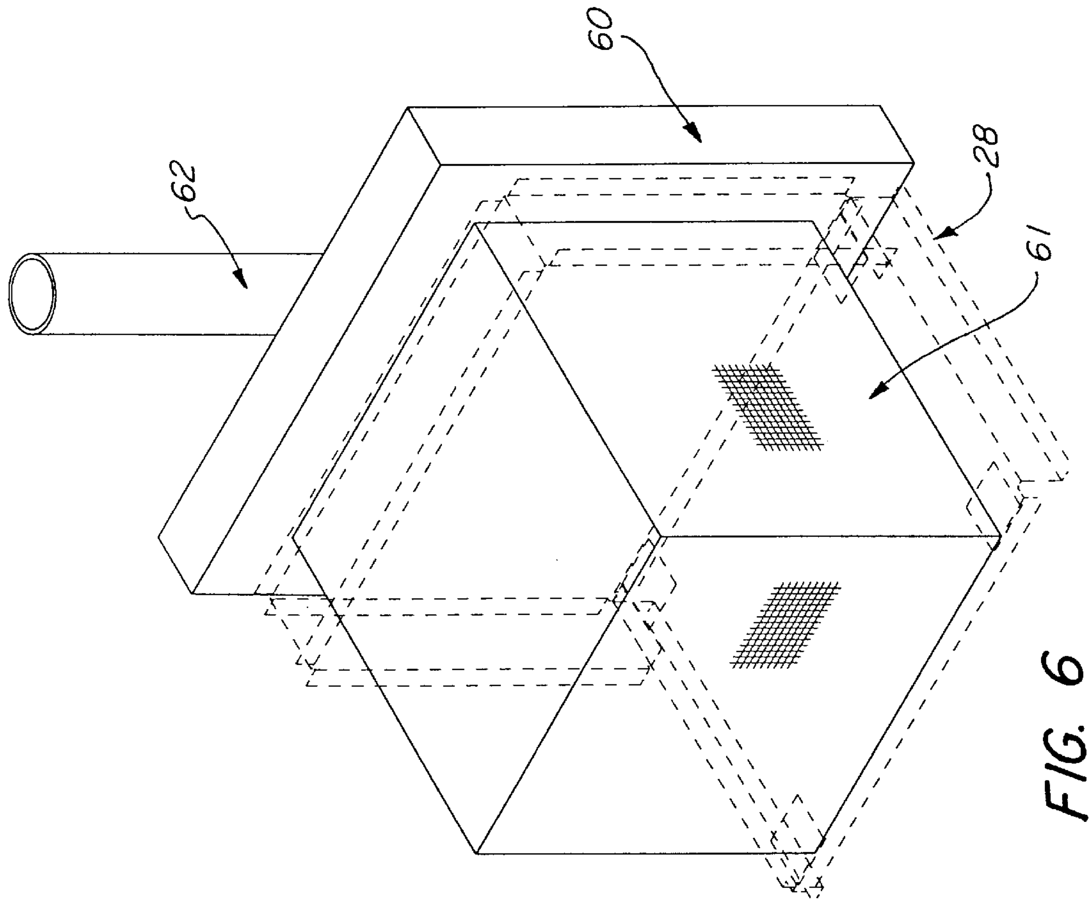
FIG. 6 is perspective view of a vacuum mold for use in the process of making the muffles of the present invention with a reinforcing structure mounted about it represented in phantom line.

As seen in FIG. 6, the skeleton 28 is seated about a vacuum mold generally designated by the numeral 60 which has a generally rectangular body portion 61 conforming substantially to the configuration desired for the muffle 10. The skeleton is spaced outwardly from the outer surface of the body portion 61 of the vacuum mold 60 on support pins 63 so as to enable the deposition of the ceramic insulation both inwardly and outwardly of the skeleton 28. A vacuum line 62 is connected to the vacuum mold so that liquid may be drawn through the body portion 61 which is formed of wire mesh.

In the method of fabricating the muffle 10, the vacuum mold 60 is desirably supported for movement between a first position disposed above the tank 64 and a second position in which it is submerged in the slurry in 68 the tank 64. A recirculation conduit 70 connects the outlet of the vacuum pump 72 to the tank 64 for the purpose of recirculating fluid to the tank 64.

Figure 7:
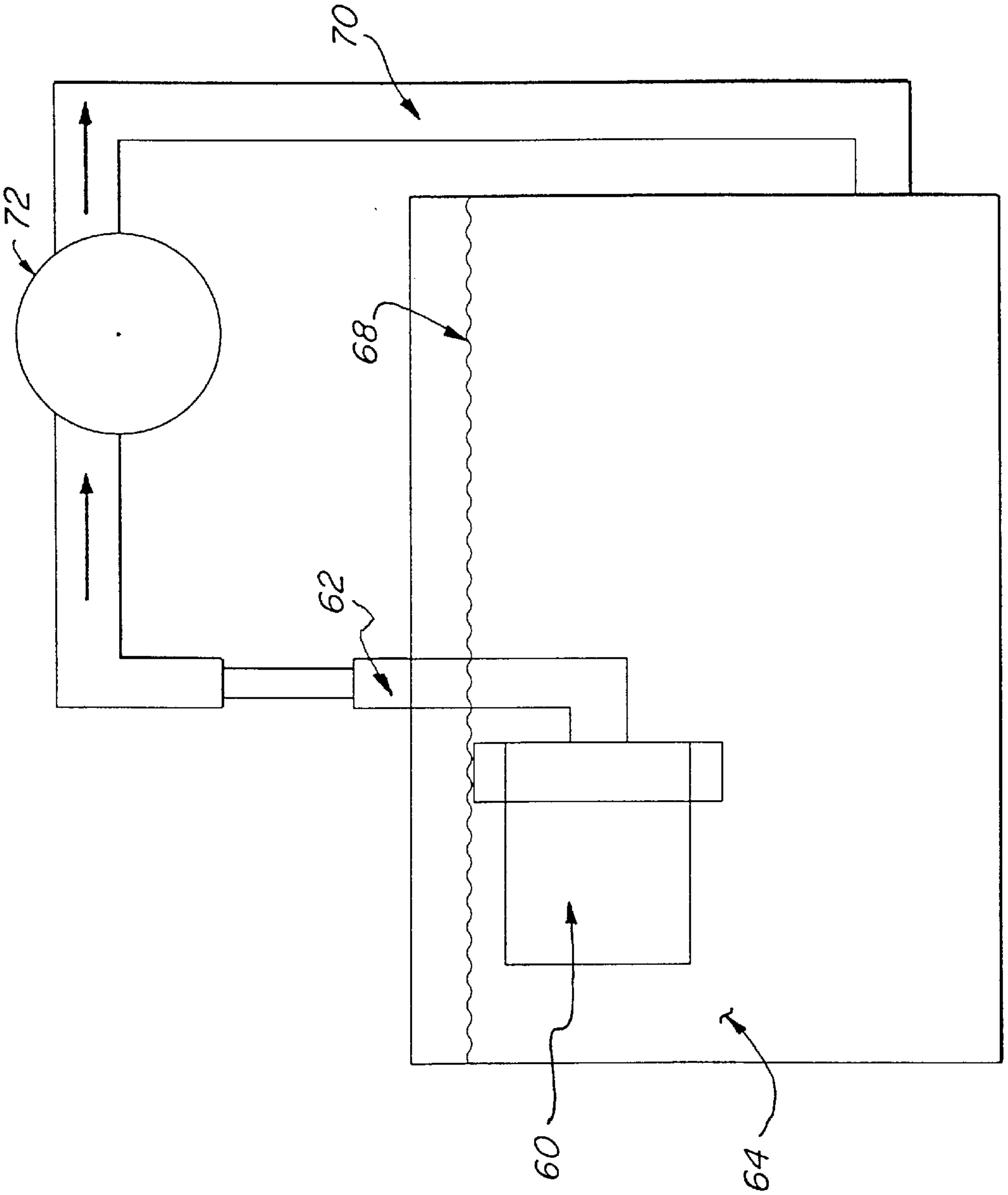
FIG. 7 is a partially diagrammatic illustration of apparatus for practicing the method of the invention.

The mold 60 with the skeleton 28 disposed there on is then immersed in the tank 64 as seen FIG. 7 which contains a slurry 68 of ceramic fibers and a bonding agent such as calcium silicate. When a vacuum is drawn through the vacuum line, the fibers in the slurry are drawn through the perforations 34 of the skeleton 28 and deposit on the exterior surface of the body portion 61 of the vacuum mold 60 and continue to deposit until the spacing therebetween is filled. Thereafter the fibers deposit on the outer surface of the skeleton 28. After the desired thickness of ceramic fibers has been deposited on the outer surface of the skeleton 28, the vacuum is discontinued and the vacuum mold 60 is removed from the tank 64 and the deposited fibrous material is allowed to air dry under vacuum. After there has been sufficient drying, the muffle 10 is removed from the vacuum mold 60 and the assembly may be subjected to further drying before the muffle is placed in use. Liquid from the aqueous slurry that is passing through the wire mesh is recirculated into the tank as illustrated in FIG. 7.

The body portion 61 of the mold 60 tapers to a slightly reduced cross section at its outer end assisting in the removal of the molded muffle 10 therefrom.

Figure 3:
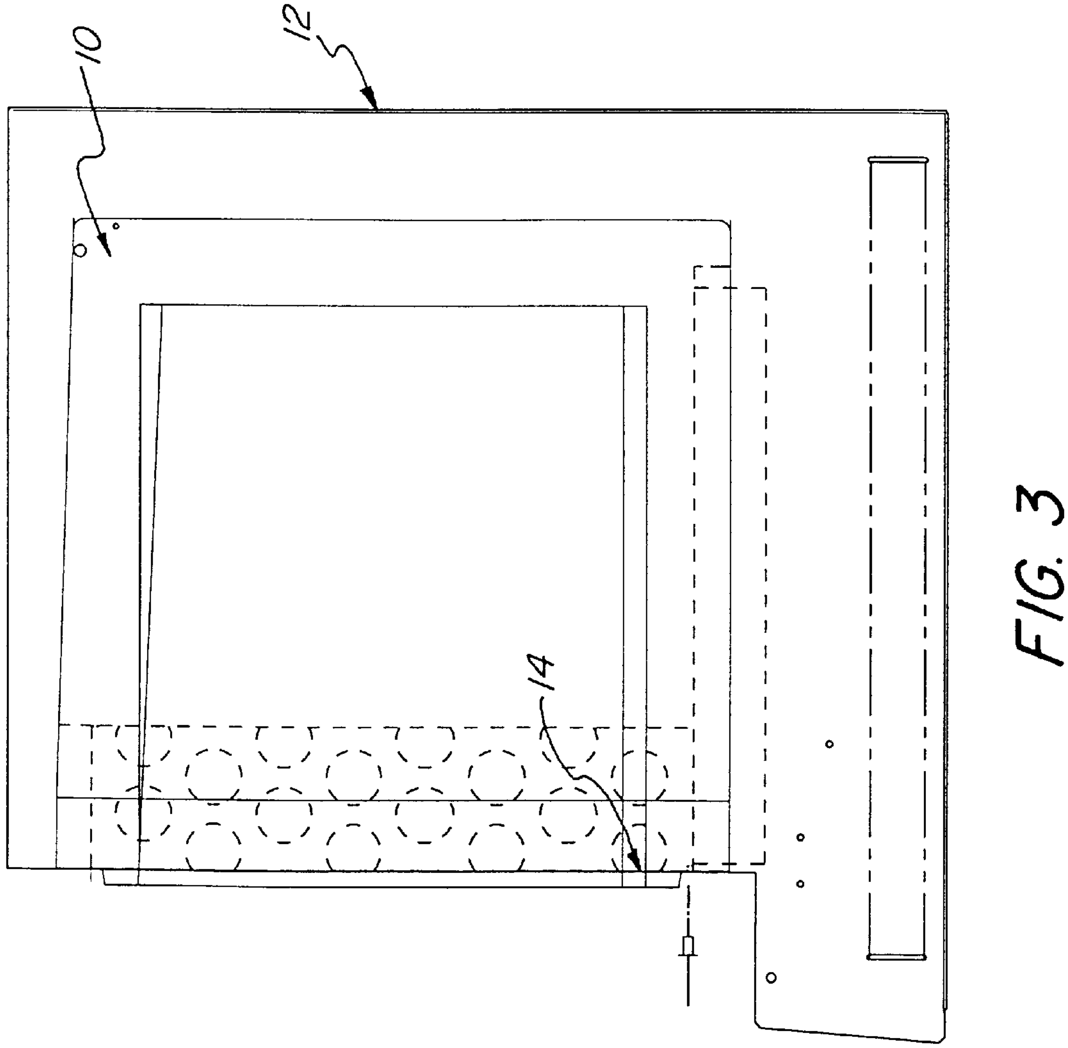
FIG. 3 is a side elevational view of a furnace containing the muffle of FIGS. 1 and 2 which is shown in phantom line.

Turning lastly to FIG. 3, there is illustrated a muffle furnace 12 in which is disposed the muffle 10 of the present invention. Fasteners 18 extending through the flange 14 to secure the muffle 10 in position within the body of the furnace 12.

The skeleton is formed from sheet metal, preferably stainless steel of about 18 gauge thickness, and it provided with a plurality of uniformly spaced and dimensioned perforations. These perforations permit insulating fibers to pass through and under the sheet metal of the skeleton and collect on the mold. As best illustrated in FIG. 4*a*, the perforations 34 are formed in a blank of sheet metal arranged in rows which are offset from one another by a distance which is approximately half the diameter of each opening. The open area in the skeleton created by the perforations is about fifty percent of the total surface area.

Illustrative of the method of forming a muffle embodying the invention is the following example.

A tank is filled with an aqueous slurry of alumina silica fibers of 2 to 3 microns in diameter and 0.25 to 2.0 inches in length and colloidal silica having a specific gravity of about 1.1. A vacuum mold is utilized having a body portion formed of approximately 40×40 mesh grid as the surface of vacuum die. A stainless steel skeleton of the type illustrated is formed of sheet metal having a thickness of approximately 18 gauge with perforations or openings forming fifty percent of its area. The skeleton is mounted on the mold with a spacing of about a half inch provided between the mold surface and the skeleton. The mold and skeleton are lowered into the tank and a vacuum of 25 inches of mercury is applied to the mold. Silica fibers collect on the body portion of the mold and upon the skeleton until about a 1½ to 2 inch total wall thickness is achieved. The mold with the skeleton and deposited collected fibers is raised from the tank and the vacuum is continued for a short period after raising the mold from the tank so that excess moisture is removed from the insulating fibers. The vacuum on the mold is reversed and a positive pressure is applied to assist in the removal of the muffle from the vacuum mold. A drying support having an external shape and dimensions corresponding to those of the muffle chamber 18 is placed inside the muffle to maintain its internal dimensions during drying. The drying support and the muffle are placed in a drying oven for approximately 12 hours and baked at 300° F. Heating plates are then assembled therewith and the muffle is then installed in a furnace.

As will be readily appreciated, the muffle of the present invention can have a cross section other than rectangular in which case the skeleton will be adapted to the configuration of the muffle. Although the illustrated embodiment utilizes an upper part for the skeleton which extends only over a portion of the length of the muffle, it will be appreciated that the skeleton can extend over the full length of the muffle and further that the muffle skeleton may also provide a rear wall. Such a more complete skeleton is desirable where there is anticipated possible impacts upon the walls of the muffle.

As can be seen from the foregoing detailed description and attached drawings, the muffle of the present invention is one which can be formed relatively easily from components which are relatively economical to provide a long lived, one-piece structure. The muffle can be varied in configuration and in strength and in insulating thickness by simple variations in the fabricating process.

What is claimed is:

1. A unitary reinforced ceramic fiber enclosure for muffle furnaces defining an elongated cavity therewithin for receiving workpieces and heating elements, said enclosure being self-supporting and having an elongated peripheral wall of rectangular cross section with base wall, top wall, rear wall and side walls, said enclosure being open at its front end for the introduction of workpieces thereinto and comprising:

(a) a sheet metal skeleton defining at least a portion of the peripheral wall of the enclosure and having front and rear ends, said skeleton extending substantially over the length of said base wall of said enclosure and having a pair of side walls and at least one transverse wall providing one or both of a top wall and base wall, said skeleton having perforations extending over substantially the entire area of said walls; and (b) ceramic fiber insulation encapsulating each of said walls of said skeleton with continuous layers of insulation on the inner and outer surfaces of said skeleton and with ceramic fibers of said insulation extending through all of the perforations in said walls of said skeleton to join said layers, the thickness of said insulation on the inner surface of said skeleton being at least about ¼ the total thickness of said insulation.

2. The reinforced ceramic fiber enclosure in accordance with claim 1 wherein at least one of said walls of said skeleton extends over only a portion of the length of said walls of said enclosure.

3. The reinforced ceramic fiber enclosure in accordance with claim 1 wherein said skeleton includes a perforate rear wall.

4. The reinforced ceramic fiber enclosure in accordance with claim 1 wherein said skeleton has an outwardly extending flange at the front end of said enclosure for attachment to the support structure of a muffle furnace.

5. The reinforced ceramic fiber enclosure in accordance with claim 1 wherein said skeleton includes an outwardly extending flange at the rear end thereof.

6. The reinforced ceramic fiber enclosure in accordance with claim 1, wherein said skeleton has a base wall and depending flanges extending along the sides of said base wall of said enclosure.

7. A unitary reinforced ceramic fiber enclosure for muffle furnaces defining an elongated cavity therewithin for receiving workpieces, and heating elements disposed about the inner periphery of said enclosure, said enclosure being self-supporting and of rectangular cross section and having an elongated peripheral wall with base wall, top wall, and side walls, and a rear wall extending transversely between said side walls, top wall and base walls at one end thereof, said enclosure being open at the other end thereof, said enclosure including:

(a) a sheet metal skeleton defining at least a portion of the peripheral wall of the enclosure and having front and rear ends, said skeleton having side walls and at least one transverse wall providing one or both of a top wall and base wall, said skeleton having an outwardly extending flange at said front end of said enclosure for attachment to the support structure of a muffle furnace, said skeleton having perforations extending over substantially the entire area of said walls; and (b) ceramic fiber insulation encapsulating said skeleton with continuous layers of insulation on the inner and outer surfaces of said skeleton and with ceramic fibers of said insulation extending through all of the perforations in said walls of said skeleton.

8. The reinforced ceramic fiber enclosure in accordance with claim 7 wherein said top and side walls of said skeleton extend over only a portion of the length of said enclosure.

9. The reinforced ceramic fiber enclosure in accordance with claim 7 wherein said skeleton includes an outwardly extending flange at the rear end thereof.

10. The reinforced ceramic fiber enclosure in accordance with claim 7 wherein said skeleton includes a perforate rear wall.

* * * * *